United States Patent [19]
Tasaki et al.

[11] Patent Number: 5,902,226
[45] Date of Patent: May 11, 1999

[54] METHOD OF PREPARING A PROPANOL SOL OF SILICA

[75] Inventors: Keiko Tasaki, Funabashi; Yasuyoshi Hamada, Sodegaura; Takafumi Yokoyama, Funabashi, all of Japan

[73] Assignee: Nissan Chemical Industries, Ltd., Tokyo, Japan

[21] Appl. No.: 08/616,375

[22] Filed: Mar. 15, 1996

Related U.S. Application Data

[63] Continuation-in-part of application No. 08/286,168, Aug. 5, 1994, abandoned.

[51] Int. Cl.$^6$ ............................ C01B 33/18; C03C 17/25
[52] U.S. Cl. ..................... 516/34; 516/928; 106/287.16
[58] Field of Search ............................ 252/309; 516/34, 516/928; 106/287.16, 287.17

[56] References Cited

U.S. PATENT DOCUMENTS

| | | | |
|---|---|---|---|
| 2,375,738 | 5/1945 | White | 252/309 |
| 2,383,653 | 8/1945 | Kirk | 252/309 |
| 2,408,656 | 10/1946 | Kirk | 252/309 |
| 2,433,776 | 12/1947 | Marshall | 252/309 |
| 2,433,778 | 12/1947 | Marshall | 252/309 |
| 2,892,797 | 6/1959 | Alexander et al. | 252/313.2 |
| 3,351,561 | 11/1967 | Albrecht et al. | 252/309 |
| 3,855,145 | 12/1974 | Vossos | 252/309 |
| 5,185,037 | 2/1993 | Kaijou | 252/313.2 |
| 5,230,833 | 7/1993 | Romberger et al. | 252/313.2 |

FOREIGN PATENT DOCUMENTS

| | | |
|---|---|---|
| 506315 | 10/1954 | Canada . |
| 0 607 710 | 7/1994 | European Pat. Off. . |
| 43-4649 | 2/1968 | Japan . |
| 59-8614 | 1/1984 | Japan . |
| 63-123807 | 5/1988 | Japan . |
| 6-199515 | 7/1994 | Japan . |

OTHER PUBLICATIONS

Industrial Solvents Handbook, Second Edition, Edited by Ibert Mellan (Noyes Data Corp., Parkridge NJ, 1977) pp. 174–176, 181, 188–189, 191, 193, & 489.

*Primary Examiner*—Richard D. Lovering
*Assistant Examiner*—Daniel S. Metzmaier
*Attorney, Agent, or Firm*—Oliff & Berridge, PLC

[57] ABSTRACT

A propanol sol of silica having a specific surface area of 25 to 550 m$^2$/g, the sol having an SiO$_2$ concentration of 10 to 50% by weight of SiO$_2$ and a residual content of a medium containing 7.5% by weight or less of water based on the SiO$_2$ content and 90% by weight or more of propanol, is prepared by an improved process involving replacing the aqueous medium in an acidic aqueous sol of silica containing 5 to 50% by weight of SiO$_2$ and a medium having a water content of 15% by weight or more with propanol by an atmospheric distillation method in which a concentration of 5 to 50% by weight of SiO$_2$ in the sol and 1 to 85% by weight of methanol in the medium in the sol is maintained when the medium in the sol during the replacement contains 15 to 0.5% by weight of water.

13 Claims, No Drawings

1

METHOD OF PREPARING A PROPANOL SOL OF SILICA

This is a continuation-in-part application of application Ser. No. 08/286,168, filed Aug. 5, 1994, now abandoned.

BACKGROUND OF THE INVENTION

1. Field of the Invention

The present invention relates to an improvement in a method of preparing a propanol sol of silica by a process comprising replacing the aqueous medium in an aqueous silica sol with propanol, and is more specifically directed to a method of preparing efficiently a stable propanol sol of silica having a specific surface area of 25 to 550 m²/g, said sol containing no aggregate or gel of silica and having an $SiO_2$ concentration of 10 to 50% by weight and a residual content of a medium containing 7.5% by weight or less of water based on the $SiO_2$ content and 90% by weight or more propanol, by a process comprising replacing the aqueous medium in an aqueous silica sol with propanol by an atmospheric distillation method.

2. Description of Prior Art

In the specification of U.S. Pat. No. 2,375,738 is disclosed a method of preparing an organo-aquasol of silica which comprises preparing an aquasol of silica having a pH of 0.5 to 8.5 by peptizing an aquagel of silica with caustic soda, and adding thereto a water-miscible organic solvent such as propyl alcohol. The specification also discloses a method of preparing an organosol of silica by a process comprising adding to an aquasol of silica a water-miscible organic solvent having a boiling point lower than that of water, thereafter adding benzene so as to form a medium of ternary constant boiling mixture and removing all or a part of the water from the mixture by boiling.

The specification of U.S. Pat. No. 2,433,776 discloses a method of preparing a stable and substantially anhydrous organosol, such as butyl alcohol or butyl acetate sol of silica. The method comprises forming first a propyl alcohol sol, adding thereto the butyl alcohol or butyl acetate and finally removing the propyl alcohol by distillation. The propyl alcohol sol is formed by a process comprising preparing an aquasol containing dissolved inorganic salt, thereafter adding propyl alcohol so as to precipitate the salt, followed by removal of the water from the sol by distillation, then removing the precipitate of the salt and completely removing the water by distillation.

U.S. Pat. No. 3,351,561 discloses a method of preparing an organosol of silica which comprises the steps of adding an organic water miscible hydrogen bonding agent which has a dipole moment of at least 3.0 Debye units to a salt-free aquasol of silica containing from 20% to 60% by weight of silica to form a reaction system, with the amount of hydrogen bonding agent being present in a mol ratio per mol of surface silanol groups present in the silica particles of the sol of from 10:1 to 1:1, adding under vacuum to the reaction system a water miscible monohydric alcohol in an amount of from 1 to 7 volumes per volume of water present in the salt-free aquasol of silica, the alcohol having a boiling point greater than 50° C., maintaining the vacuum and heating the reactants under conditions whereby substantially all the water is removed from reaction system, releasing the vacuum, heating the water miscible alcohol of the formed organosol of silica containing 20–60% by weight of silica to its reflux temperature at ambient pressure and maintaining the temperature for at least ¼ hour. U.S. Pat. No. 3,351,561 also discloses that the hydrogen bonding agent provides a protective solvent shell around the silica particles to protect the particles from agglomerating which is believed to cause subsequent gelation or precipitation.

U.S. Pat. No. 3,855,145 discloses a method of preparing an organosol of silica which comprises the steps of passing an aquasol of silica containing 20–60% colloidal particles of amorphous silica through a cation exchange resin in the hydrogen form and a strong base anion exchange resin in the hydroxide form to produce a single deionized sol and after a holding time of 12–24 hours passing the single deionized sol through a cation exchange resin and an anion exchange resin to produce a double deionized silica sol having an $SiO_2$ content of from 50 to 70% by weight, adding said double deionized sol of silica to a reaction vessel containing a water-miscible organic alcohol, feeding additional water-miscible organic alcohol as a water alcohol azeotrope is removed by vacuum distillation at a temperature below about 100° C., and recovering the organosol of silica. U.S. Pat. No. 3,855,145 also discloses that when the water content is above about 5% to about 25%, precipitation occurs at temperatures below 100° C., and that the reason why precipitation does not occur during the vacuum distillation preparation of the organosols when the water content falls within this range is that the total time of the vacuum distillation is short.

Japanese Patent Publication No. Sho 43-4649 (4649/1968) discloses a method of preparing a methanol sol of silica comprising adding methanol to an aqueous silica sol having a molar ratio of 300 or more as $SiO_2/Me_2O$, wherein Me represents a monovalent cation, and distilling out the water together with the added methanol so as to cause substitution of the water in the sol for methanol, thereby to form a methanol sol in which 0.35 mol or less of water is contained to 1 mol of the $SiO_2$ content in the sol.

Japanese Laid-open Patent Publication No. Sho 59-8614 (8614/1984) discloses a method of preparing a sol of silica dispersed in an organic solvent, comprising mixing an aqueous silica sol with an organic solvent such as, for example, isopropyl alcohol and then removing water from the sol by ultrafiltration, thereby to form, for example; an isopropyl alcohol sol which has an $SiO_2$ concentration of 20.3% by weight and a water concentration of 1.8% by weight that is calculated as about 9% by weight to the $SiO_2$ content in the sol.

The method of replacing water in an aqueous silica sol with isopropyl alcohol by ultrafiltration has a problem in that it requires a remarkably long time to obtain a propanol sol having an $SiO_2$ concentration of 20 to 30% by weight and a water content of about 3% by weight, because when the water content in the sol reduces to about 5% by weight, viscosity of the sol increases and the speed of the ultrafiltration decreases remarkably.

In the method of replacing water in an aqueous sol with isopropyl alcohol by atmospheric distillation, an increase in viscosity at a water content of about 10% by weight or less in the sol occurs, and additionally aggregates or gels of silica often occur at this water content in the sol, resulting in deterioration of the product.

U.S. Pat. No. 3,351,561 discloses a step of preparing an organosol of silica which comprises stabilizing the sol by adding a hydrogen bonding agent. However, the recovered organosol of silica tends to contain a residue of the hydrogen bonding agent. Accordingly, the usefulness of the sols is limited since the residues are inconvenient for some specific uses. And it is not efficient, from a commercial standpoint, to require the step of heating the organosol of silica to its reflux temperature and maintaining such temperature in order to partially esterify the silanol particles in the sol. U.S. Pat. No. 3,855,145 discloses multiple steps of the double deionization which comprises double deionizing and a holding time of 12–24 hours. Thus, from a commercial standpoint, the method which requires multiple steps is not efficient. Furthermore, the above-mentioned methods require additional equipments consisting of vacuum units, highly efficient refrigerators, highly efficient heat-exchangers (condensers) and so on. Accordingly, from a commercial standpoint, these methods are not desirable.

U.S. Pat. No. 2,375,738 discloses a method of preparing an organosol of silica which comprises replacing an aqueous medium in an acidic aquasol of silica with merely propanol by an atmospheric distillation. When the medium in the sol has a water content of about 15% by weight or less on replacing the medium, precipitation occurs and an increase in viscosity in the sol occurs. Therefore, from an industrial standpoint, the method is not desirable to prepare a stable and substantially anhydrous propanol sol of silica. U.S. Pat. No. 2,433,776 discloses a sol of silica which comprises a low molecular weight polysilicic acid prepared by the treatment of an aqueous silicate solution with a suitable acid. As the low molecular weight polysilicic acid has ordinarily a mean diameter of less than 3 milimicrons and a specific surface area of more than 700 m$^2$/g, the sol of silica is not stable for supplying commercial product generally.

SUMMARY OF THE INVENTION

It is an object of the present invention to provide a method of preparing efficiently a stable propanol sol of silica having a specific surface area of 25 to 550 m$^2$/g, the sol containing no aggregate or gel of silica and having an SiO$_2$ concentration of 10 to 50% by weight and a residual content of a medium containing 7.5% by weight or less of water based on the SiO$_2$ content and 90% by weight or more of propanol.

It is another object of the present invention to provide an improvement in a method of preparing propanol sol of silica having a specific surface area of 25 to 550 m$^2$/g, the sol containing no aggregate or gel of silica and having an SiO$_2$ concentration of 10 to 50% by weight and a residual content of a medium containing 7.5% by weight or less of water based on the SiO$_2$ content and 90% by weight or more of propanol, by a process comprising replacing an aqueous medium of an acidic aqueous sol of silica containing 5 to 50% by weight of SiO$_2$ and a medium having a water content of 15% by weight or more with propanol by adding propanol to said acidic aqueous sol and distilling said acidic aqueous sol under atmospheric pressure, wherein said method further comprises adding methanol to said acidic aqueous medium in order to maintain a concentration of 5 to 50% by weight of SiO$_2$ in the sol and 1 to 85% by weight of methanol in the medium in the sol during the time of said replacing of aqueous medium when the medium in the sol contains 15 to 0.5% by weight of water, and said replacing continuing until said stable propanol sol is obtained.

The preparation of the propanol sol of silica according to the present invention is carried out by replacing the aqueous medium in the acidic aqueous sol of silica with propanol by an efficient atmospheric distillation method. So long as the medium in the formed sol contains methanol in an amount over 1% by weight, there occurs neither an increase in viscosity of the formed sol nor precipitation of silica in the formed sol in proceeding further with the replacement of water with propanol, even when the medium in the formed sol has a water content of 15% by weight or less.

DETAILED DESCRIPTION OF THE INVENTION

The propanol may be isopropyl alcohol or normal propyl alcohol.

The silica in the acidic aqueous sol is in a form of colloidal particle of amorphous silica, and the particle may have any shape known to the art. The particle of colloidal silica has a specific surface area of 25 to 550 m$^2$/g. With a spherical particle of colloidal silica, the particle size is calculated by the equation D=2720/S, wherein S means specific surface area in (m$^2$/g) measured by a method of nitrogen gas adsorption, i.e., the BET method, and D means the diameter of the particle in nanometers (nm). With a particle of colloidal silica having an elongated shape, the particle should have a uniform thickness of 5 to 40 nm, a diameter $D_1$ of 40 to 500 nm as measured by dynamic light-scattering method and a degree of elongation $D_1/D_2$ of 5 to 30, wherein $D_2$ means a diameter in nm calculated by the equation $D_2$=2720/S and S means specific surface area in m$^2$/g of the particle, as is disclosed in the specification of U.S. Pat. No. 5,221,497, which is incorporated herein by reference.

The acidic aqueous sol contains the colloidal silica in an SiO$_2$ concentration of 5 to 50% by weight in an aqueous medium. The medium may be composed of water alone or a mixture of water and at least a member selected from the group consisting of methanol and propanol in a concentration of 15% by weight or more of water. The sol in which the medium is composed of water and methanol, propanol or a mixture thereof is obtained by a method of adding methanol, propanol or a mixture thereof to an acidic aqueous sol of silica in which the medium is composed of water alone, or replacing the water in the sol in which the medium is composed of water alone with the alcohol by a method of atmospheric distillation or ultrafiltration.

The preferred acidic aqueous sol of silica is one containing Al$_2$O$_3$ in the colloidal silica in a ratio of 0.0004 to 0.003 mol to 1 mol of the SiO$_2$ of the colloidal silica.

The preferred acidic aqueous sol of silica contains substantially no cation of base in free form and has a pH of 2 to 4. The sol contains preferably 50 weight ppm or less, more preferably 20 weight ppm or less of chloride ion, nitrate ion or a mixture thereof. Thus, the preferred acidic aqueous sol of silica is one which is obtained by deionizing an alkaline or acidic aqueous sol of silica through a cation exchange resin and an anion exchange resin.

The acidic aqueous sol of silica may be prepared by any method known to the art, and may also be available as a commercial product. The content of Al$_2$O$_3$ in the colloidal silica may be controlled in producing the colloidal silica by an ion exchange method from a water glass which contains Al$_2$O$_3$, or in a step of building up the colloidal silica produced in an ion exchange method by adding an aluminum compound to the colloidal silica, as is disclosed in Japanese laid-open patent publication No. Sho 63-123807. Japanese laid-open patent publication No. Hei 6-199515 also discloses a method of preparing colloidal silica containing Al$_2$O$_3$ by adding aluminum compound to a built up particle of colloidal silica.

The preparation of the propanol sol of silica according to the present invention is carried out by replacing the aqueous medium in the acidic aqueous sol of silica with propanol. In the replacement, the propanol is added to the acidic aqueous sol of silica, thereby forming a sol in which the medium for the silica has a lowered concentration of water and an SiO$_2$ concentration of 5 to 50% by weight. The aqueous medium is removed together with a part of the added propanol from the formed sol. The removal of the aqueous medium together with a part of the propanol can be carried out by atmospheric distillation or ultrafiltration so far as the medium in the formed sol has a water concentration of 15% by weight or more. The propanol may be added while distilling the aqueous medium out of the formed sol under atmospheric pressure.

In continuing the addition of the propanol and the removal of the aqueous medium together with a part of the propanol by atmospheric distillation or ultrafiltration, the formed sol reaches a step where the medium in the sol has an $SiO_2$ concentration of 5 to 50% by weight and a water content of about 15% by weight in the medium in the sol.

When the medium in the formed sol has a water content of 15 to 0.5% by weight in the medium in the sol, a concentration of 1 to 85% by weight of methanol in the medium in the formed sol is maintained, and further addition of the propanol to the sol and atmospheric distillation of the water together with a part of the propanol and a part of the methanol from the formed sol is continued until the formed sol has an $SiO_2$ concentration of 10 to 50% by weight and a residual content of a medium containing 7.5% by weight or less of water based on the $SiO_2$ content and 90% by weight or more of propanol. The maintenance of the content of methanol in the medium may be attained by newly adding a necessary amount of methanol to maintain the methanol concentration in the medium. The additional propanol and methanol may be added individually and independently, or as a mixture. The additions may be continuous or intermittent. The propanol and the methanol to be added into the medium may be in a form of liquid or vapor. Of these, the most preferred form is vapor form.

It is also possible to maintain the concentration of methanol in the medium, instead of by new addition of methanol, by utilizing a large content such as, for example, 70% by weight or more of methanol in a medium in a sol which is priorly formed by replacing with methanol the aqueous medium in an acidic aqueous sol. Thus, a process comprising a step (a) and a subsequent step (b) may be carried out.

In the step (a), a methanol sol having an $SiO_2$ concentration of 5 to 50% by weight and containing a medium composed of 70% by weight or more of methanol and residual amount of water is prepared by replacing water in an acidic aqueous sol with methanol. The replacement of the aqueous medium in an acidic aqueous sol can be carried out by atmospheric distillation or ultrafiltration. It is preferable to add methanol in vapor form into the aqueous medium for replacement by atmospheric distillation.

In the step (b), the methanol and the water in the methanol sol obtained in the step (a) are replaced with propanol by adding propanol to the methanol sol, thereby forming a ternary sol containing the methanol, propanol and water as the medium, while distilling the water together a part of the propanol and a part of the methanol from the ternary sol under atmospheric pressure. This step is continued, while maintaining an $SiO_2$ concentration of 5 to 50% by weight in the ternary sol and 1% by weight or more of the remaining methanol in the medium in the ternary sol when the medium in the ternary sol contains 15 to 0.5% by weight of water, until a propanol sol having an $SiO_2$ concentration of 10 to 50% by weight and a residual content of a medium containing 7.5% by weight or less of water based on the $SiO_2$ content and 90% by weight or more of propanol is obtained.

Concentration of the formed sol or the ternary sol may occur during the process so far as the sol has an $SiO_2$ concentration up to 50% by weight.

In a preferred process according to the present invention, a water soluble polybasic acid, such as sulfuric, phosphoric, oxalic, tartaric or citric acid, preferably sulfuric or oxalic acid in an amount of 0.002 to 0.7% by weight based on the $SiO_2$ in the finally formed sol may be added thereinto, or into the formed sol at the stage where the medium in the formed sol has reached a water content of 5% by weight or less, and the replacement of the aqueous medium with propanol is carried out while maintaining the methanol concentration in the formed sol in the same manner as aforementioned.

Thus, a final product of a stable propanol sol of silica having a specific surface area of 25 to 550 $m^2/g$, the sol containing no aggregate or gel of silica and having an $SiO_2$ concentration of 10 to 50% by weight and a residual content of a medium containing 7.5% by weight or less of water based on the $SiO_2$ content and 90% by weight or more of propanol is obtained.

A propanol sol of silica has usually been produced by a process comprising replacing water in an acidic aqueous sol of silica with propanol, since in a process comprising replacing water in an alkaline aqueous sol with propanol occurs gelation of the sol with decrease of water in the sol.

When the acidic aqueous sol of silica contains some amounts of cation of base in free form such as sodium, potassium or ammonium, etc., the concentration of the cation in water in the sol increases with the proceeding of the replacement of the water with propanol, and causes an increase in viscosity or the formation of gels in the sol. When the acidic aqueous sol of silica contains chloride ion, nitrate ion or a mixture thereof, the sol also tends to increase in viscosity with the proceeding of the replacement of the water with propanol. It is preferable that the sol contains 50 weight ppm or less, preferably, 20 weight ppm or less of chloride ion, nitrate ion or a mixture thereof, and that the sol exhibits a pH of 2 to 4 in the sol.

It is preferable that the acidic aqueous sol of silica has an $SiO_2$ concentration as high as possible, since the amount of the propanol necessary for replacing the aqueous medium can be reduced. However, so high an $SiO_2$ concentration over 50% by weight will cause instability of the sol. When the colloidal silica in the sol has a specific surface area larger than 550 $m^2/g$, the sol also tends to have insufficient stability. When the colloidal silica in the sol has a specific surface area smaller than 25 $m^2/g$, the colloidal silica tends to sink, and results in a lack of homogeniety of the sol.

The $Al_2O_3$ in the colloidal silica exists in a form of aluminosilicate which serves as a site where cations of a base are captured, and stabilizes the silica sol against gelling. However, $Al_2O_3$ in an amount of about 0.0004 mols or less to 1 mol of $SiO_2$ of the colloidal silica may not be sufficient to stabilize the sol, and $Al_2O_3$ in an amount over about 0.003 mols to 1 mol of $SiO_2$ of the colloidal silica, although sufficient to stabilize an aquasol, may cause an increase in viscosity or gelling of the sol during the proceeding of the replacement of the medium.

The improvement according to the present invention is based first on a finding that when the acidic aqueous sol which contains some amount of methanol is subjected to replacement of the water in the sol with propanol by atmospheric distillation, there occurs no increase in viscosity nor deposition of silica on the wall of the container of the sol, and subsequently on further studies in detail on compositions of the medium in the sol which can avoid the increase in viscosity and deposition of silica during the replacement of the water in the sol with propanol by atmospheric distillation at a stage when the water content in the medium in the sol is reduced to an extent lower than about 15% by weight. It is believed that the methanol in the acidic sol having the reduced amount of water serves as a stabilizer against gelling of the colloidal silica in proceeding further with the replacement of water with propanol.

Methanol in an amount less than 1% by weight in the medium in the formed sol is not sufficient upon the replacement by atmospheric distillation to avoid the increase in viscosity of the formed sol which contains 15 to 0.5% by weight of water in the medium in the formed sol. So long as the medium in the formed sol contains methanol in an amount over 1% by weight, preferably, 1 to 85% by weight at methanol, no increase in viscosity of the formed sol containing a medium having a water content of 15 to 0.5% by weight occurs in proceeding further with the replacement of water with propanol by atmospheric distillation. When, for example, the vapor of alcohols such as propanol and methanol is added into the medium upon the replacement by atmospheric distillation, the vapor condenses in the medium. The latent heat from condensation of the vapor is utilized to evaporate the water in the medium in the sol. Therefore, the temperature of the medium for heating the reactor (the distillation still) can be lowered, resulting in avoiding deposition of silica on the wall of the reactor.

In a further embodiment, the addition of polybasic acid to the propanol sol may reduce the viscosity of the sol. It is believed that the polybasic acid is adsorbed on the surface of the colloidal particle of silica and increases the amount of negative charge on the surface of the particle, resulting in strengthening of the repulsion between the colloidal particles and preventing the particles from aggregation thereof. However, when the polybasic acid is added at a stage when the medium in the sol has a water content higher than 5% by weight, the sol tends to increase in viscosity during the atmospheric distillation of water in the sol. The polybasic acid in an amount less than 0.002% by weight based on the $SiO_2$ in the sol may not be effective to lower the viscosity of the sol having the lowered content of water, and in an amount over 0.7% by weight based on the $SiO_2$ in the sol may not serve to increase the effect.

The propanol sol of silica prepared by a process according to the present invention has a low viscosity, since the process avoids an increase in viscosity during the replacement of water in aqueous sol with propanol by atmospheric distillation, or lowers the viscosity of the propanol sol of silica owing to the addition of polybasic acid. The sol contains no aggregate or gel of silica and may have a concentration up to 50% by weight of $SiO_2$ and is stable at all the concentrations. The sol may have an extremely low content of water and can be applied in various usages. The sol will especially be useful as, for example, a component to be incorporated into a coating agent for forming a hard and thin film on a surface of a molded article of synthetic resin such as a lens, bottle, film or plate, where the colloidal silica in the sol serves as a micro filler in the hard and thin film formed. A coating agent containing the sol together with a synthetic polymer such as, for example, acrylic, silicon, etc., may be applied on a surface of a metallic substrate such as steel and will give, when the agent is dried, a film protective against corrosion of the metal. Those films formed from the coating agents containing the sol show a high transparency because of an absence of silica gel in the sol.

EXAMPLES

Example 1

An acidic aqueous silica sol having a pH of 2.9, an $SiO_2$ concentration of 31.2% by weight, an $Al_2O_3$/$SiO_2$ molar ratio of 0.0014 and a viscosity of 2.9 mPa•s at 25° C.; in which the colloidal silica has a spherical shape and a particle size of 12 nm as calculated from a measured specific surface area of 227 $m^2$/g, is prepared by decationizing through a cation exchange column a commercial product of alkaline aqueous silica sol named Snowtex-30 produced by Nissan Chemical Industries, Ltd., and subsequently deanionizing through an anion exchange column the decationized sol, and then concentrating through an ultrafilter the deanionized sol.

1000 g of the aqueous silica sol having a pH of 2.9 is charged into a glass reactor having an inner volume of 2 liters equipped with a stirrer, a condenser, a thermometer and two inlets for charging materials.

The aqueous silica sol in the glass reactor is heated in an oil bath to the boiling point under atmospheric pressure, and then vapor of isopropyl alcohol generated in a boiler is continuously introduced into the silica sol in the reactor while maintaining the boiling of the liquid in the reactor to distill the water out of the sol together with the isopropyl alcohol under atmospheric pressure. The evaporated vapor in the reactor is introduced into the condenser and recovered as a condensate.

At the time of 180 minutes after the commencing of the introduction of vapor of isopropyl alcohol, the liquid in the reactor shows a temperature of 80.6° C. as a boiling point under atmospheric pressure, and the recovered condensate outside the reactor counts as a whole 2.4 liters. A few droplets of condensate recovered at the time show a composition of 17 parts by weight of water and 83 parts by weight of isopropyl alcohol.

After this time, vapor of isopropyl alcohol is continuously introduced into the liquid in the reactor, while methanol in liquid form is continuously supplied into the reactor, and the content of methanol in the medium in the sol in the reactor is maintained in a range of 2 to 5% by weight. The introduction of vapor of isopropyl alcohol is continued until the liquid in the reactor is at a temperature of 79.5° C. as a boiling point under atmospheric pressure. Any increase in viscosity of the liquid in the reactor does not occur and any deposition of silica on the wall of the reactor is not observed.

There is finally obtained 865 g of isopropyl alcohol sol of silica having an $SiO_2$ concentration of 36.0% by weight, a water content of 0.4% by weight, a methanol content of 2.2% by weight, a viscosity of 9.5 mpa•s at 20° C. and a pH of 3.6 when diluted with the same weight of water as that of the sol.

The analysis of water content in the recovered condensate and the final sol is carried out by Karl Fischer's method. The methanol content in the sol is analyzed by gas chromatography.

Comparative Example 1

In this example, the same replacement of water in the sol with isopropyl alcohol is carried out as in Example 1, except that no methanol is added to the liquid in the reactor.

The introduction of vapor of isopropyl alcohol is continued for a time of 210 minutes until the liquid in the reactor is at a temperature of 80.4° C. as a boiling point under atmospheric pressure, and 2.8 liters as a whole of the condensate are recovered. At the time of 210 minutes after the commencing of introduction of isopropyl alcohol, the liquid in the reactor starts increasing in viscosity, and subsequently depositions of silica gel are observed here and there on the wall of the reactor contacting with the liquid. A few droplets of the condensate are recovered at the time the increase in viscosity starts. The condensate shows a composition of 14 parts by weight of water and 86 parts by weight of isopropyl alcohol. The introduction of vapor of isopropyl alcohol is stopped at this time.

There is finally obtained 920 g of a sol having an $SiO_2$ concentration of 32% by weight, a water content of 8.8% by weight, a viscosity of 270 mPa•s at 20° C. and a pH of 3.6 when diluted with the same weight of water as that of the sol. The water content is calculated as 27.5% by weight based on the $SiO_2$ content in the sol.

Example 2

In this example, aqueous medium of the silica sol is first replaced partially with methanol in a step (a) and then further replaced with isopropyl alcohol in a step (b).

Step (a):

1000 g of the same aqueous silica sol having a pH of 2.9 as that used in Example 1 is charged into a glass reactor having an inner volume of 2 liters equipped with a stirrer, a condenser, a thermometer and an inlet for charging materials.

The aqueous silica sol in the glass reactor is heated in an oil bath to the boiling point under atmospheric pressure, and then vapor of methanol generated in a boiler is continuously introduced into the silica sol in the reactor while maintaining the boiling of the liquid in the reactor to distill the water out of the sol together with the methanol under atmospheric pressure. The evaporated vapor in the reactor is introduced into the condenser and recovered as a condensate.

At the time of 330 minutes after the commencing of introduction of vapor of methanol when the temperature of the liquid in the reactor reaches a boiling point of 68.5° C. under atmospheric pressure, the introduction of vapor of methanol is stopped. There is recovered 3.3 liters as a whole of the condensate outside the reactor, and there is formed a silica sol having an $SiO_2$ concentration of 35% by weight. The medium in the sol consisted of 16 parts by weight of water and 84 parts by weight of methanol.

Step (b):

To the formed silica sol in the reactor in step (a) is introduced vapor of isopropyl alcohol continuously to distill the water and methanol in the sol together with a part of the isopropyl alcohol under atmospheric pressure, and the evaporated vapor in the reactor is introduced into the condenser and recovered.

The introduction of vapor of isopropyl alcohol is continued until the liquid in the reactor shows a temperature of 80° C. as a boiling point under atmospheric pressure, and the recovered condensate counted as a whole 1.5 liters. All through the process, methanol concentration in the liquid in the reactor is maintained at 84 to 1% by weight without any addition thereinto of new methanol, and there occurs neither an increase in viscosity of the liquid nor deposition of silica on the wall of the reactor.

There is finally obtained an isopropyl alcohol sol of silica which had an $SiO_2$ concentration of 32.6% by weight, a methanol content of 0.76% by weight, a water content of 0.81% by weight, a viscosity of 10.6 mpa•s at 20° C. and a pH of 3.5 when diluted with the same weight of water as that of the sol.

In one variation in the above step (a), the introduction of vapor of methanol under atmospheric pressure is continued until a sol which contains 34% by weight of $SiO_2$ and a medium composed of 2.5 parts by weight of water and 97.5 parts by weight of methanol is formed, and subsequently as a variation in the above step (b), the water and methanol in the formed sol is replaced with propanol by atmospheric distillation. There is also obtained an isopropyl alcohol sol of silica having an $SiO_2$ concentration of 33.0% by weight, a methanol content of 1.5% by weight, a water content of 0.72% by weight, a viscosity of 9.0 mPa•s at 20° C. and a pH of 3.4 when diluted with the same weight of water as that of the sol.

Example 3

Aqueous solutions $(a_1)$, $(a_2)$, $(a_3)$, $(a_4)$ and $(a_5)$ each having a concentration of 10% by weight of acid listed in Table 1 are prepared by dissolving the acid into water.

Into the isopropyl alcohol sol of silica having an $SiO_2$ concentration of 32.6% by weight obtained in Example 2 is added isopropyl alcohol to form an isopropyl alcohol sol having an $SiO_2$ concentration of 30.2% by weight. The aqueous solution $(a_1)$ in an amount of 0.05% by weight based on the isopropyl alcohol sol is added to the sol having an $SiO_2$ concentration of 30.2% by weight to form a sol modified by the acid. The viscosity at 20° C. and the pH of the sol so modified are measured and listed in Table 1. The pH of the sol is measured after dilution of the sol with the same weight of water as that of the sol.

In the same manner as the above, but instead of aqueous solution $(a_1)$, modified sols are obtained with each aqueous solution $(a_2)$ $(a_3)$, $(a_4)$ and $(a_5)$. The measured viscosity at 20° C. and pH of the sol so modified are also listed in Table 1.

For comparison, a sol modified by pure water, instead of the acid solution, is prepared in the same manner as above. The measured viscosity at 20° C., and pH of the sol are also listed in Table 1.

TABLE 1

| solution | acid | viscosity(mPa · s) | pH |
|---|---|---|---|
| $(a_1)$ | HCl | 13.7 | 3.12 |
| $(a_2)$ | $HNO_3$ | 10.0 | 3.26 |
| $(a_3)$ | $H_2SO_4$ | 5.6 | 3.29 |
| $(a_4)$ | oxalic | 6.7 | 3.50 |
| $(a_5)$ | acetic | 8.8 | 3.50 |
| water | — | 9.0 | 3.55 |

The above example with solution $(a_3)$ of sulfuric acid and solution $(a_4)$ of oxalic acid show that these acids lower the viscosity of the propanol sol of silica, while solution $(a_1)$ of hydrochloric acid or solution $(a_2)$ of nitric acid increases the viscosity of the propanol sol of silica and solution $(a_5)$ of acetic acid is not sufficient to lower the viscosity of the propanol sol of silica.

Example 4

In this example, an isopropyl alcohol sol of silica having a particle size of 20.5 nm is prepared in the same manner as in Example 2.

An acidic aqueous silica sol having a pH of 2.8, an $SiO_2$ concentration of 33.3% by weight, an $Al_2O_3/SiO_2$ molar ratio of 0.0017 and a particle size of 20.5 nm calculated from a measured specific surface area of 133 $m^2/g$ is prepared by decationizing through a cation exchange resin a commercial product of alkaline aqueous silica sol named Snowtex-50 produced by Nissan Chemical Industries, Ltd., followed by deanionizing the decationized sol through an anion exchange resin, and subsequently again decationizing through a cation exchange resin the deanionized sol.

1000 g of the aqueous silica sol having a pH of 2.8 is charged into a glass reactor having an inner volume of 2 liters equipped with a stirrer, a condenser, a thermometer and an inlet for charging materials.

In the same manner as in the steps (a) and (b) in Example 2, the aqueous medium in the sol is first replaced with methanol to an extent that the sol formed in the reactor has a water content of 16% by weight in the medium of the sol, followed by the introduction of vapor of isopropyl alcohol to replace the water and methanol in the sol with isopropyl alcohol by atmospheric distillation. There occurs no increase in viscosity of the liquid in the reactor nor deposition of silica on the wall of the reactor. There is obtained an isopropyl alcohol sol of silica having an $SiO_2$ concentration of 35% by weight, a water content of 0.6% by weight, a methanol content of 0.8% by weight, a viscosity of 7.7 mPa•s at 20° C. and a pH of 3.1 when diluted with the same weight of water as that of the sol.

Example 5

In this example, an isopropyl alcohol sol of silica having a particle size of 84 nm is prepared.

An acidic aqueous silica sol having a pH of 2.68, a viscosity of 2.5 mPa•s at 25° C. an $SiO_2$ concentration of 28.1% by weight, an $Al_2O_3/SiO_2$ molar ratio of 0.0016 and a particle size of 84 nm calculated from a measured specific surface area of 32.4 $m^2/g$ is prepared by decationizing through a cation exchange resin a commercial product of alkaline aqueous silica sol named Snowtex-ZL produced by Nissan Chemical Industries, Ltd, followed by heating the decationized sol at a temperature of 85° C. for a time of 3 hours in a closed reactor and deanionizing through an anion exchange resin the heated sol and finally and again decationizing through a cation exchange resin the deanionized sol.

1000 g of the aqueous silica sol having a pH of 2.68 is charged into a glass reactor having an inner volume of 2 liters equipped with a stirrer, a condenser, a thermometer and an inlet for charging materials.

In the same manner as in the steps (a) and (b) in Example 2, the aqueous medium in the sol is first replaced with methanol to an extent that the sol formed in the reactor has a water content of 22% by weight in the medium of the sol, followed by the introduction of vapor of isopropyl alcohol to replace the water and methanol in the sol with isopropyl alcohol by atmospheric distillation. There occurs no increase in viscosity of the liquid in the reactor nor deposition of silica on the wall of the reactor. The introduction of vapor of isopropyl alcohol is stopped when the liquid in the reactor shows a temperature of 81° C. as a boiling point under atmospheric pressure.

There is obtained 695 g of an isopropyl alcohol sol of silica having an $SiO_2$ concentration of 40% by weight, a water content of 0.31% by weight, a methanol content of 0.3% by weight, a viscosity of 4.0 mpa•s at 20° C. and a pH of 3.4 when diluted with the same weight of water as that of the sol.

Example 6

In this example, an isopropyl alcohol sol of silica having an elongated shape is prepared.

An acidic aqueous silica sol having a pH of 2.3, a viscosity of 8.4 mPa•s at 25° C., an $SiO_2$ concentration of 15.6% by weight, an $Al_2O_3/SiO_2$ molar ratio of 0.0012, in which the colloidal silica has a thickness of 10.5 nm, a particle size $D_1$ of 58 nm measured by dynamic light-scattering method, a calculated particle size $D_2$ of 10.5 nm from a measured specific surface area of 259 $m^2/g$ and a degree of elongation $D_1/D_2$ of 5.5, is prepared by first heating a commercial product of acidic aqueous silica sol named Snowtex-OUP produced by Nissan Chemical Industries, Ltd. at 85° C. for a time of 3 hours in a closed reactor, subsequently decationizing the heated sol, and finally concentrating the decationized sol by an evaporator.

1000 g of the aqueous silica sol having a pH of 2.3 is charged into a glass reactor having an inner volume of 2 liters equipped with a stirrer, a condenser, a thermometer and an inlet for charging materials.

In the same manner as in the steps (a) and (b) in Example 2, the aqueous medium in the sol is first replaced with methanol to an extent that the sol formed in the reactor has a water content of 1.8% by weight in the medium of the sol, followed by the introduction of vapor of isopropyl alcohol to replace the water and methanol in the sol with isopropyl alcohol by atmospheric distillation. There occurs no increase in viscosity of the liquid in the reactor nor deposition of silica on the wall of the reactor. The introduction of vapor of isopropyl alcohol is stopped when the liquid in the reactor shows a temperature of 80.5° C. as a boiling point under atmospheric pressure.

There is obtained 1000 g of an isopropyl alcohol sol of silica having an $SiO_2$ concentration of 15.5% by weight, a water content of 0.12% by weight, a methanol content of 1.0% by weight, a viscosity of 8.5 mpa•s at 20° C. and a pH of 3.54 when diluted with the same weight of water as that of the sol.

Comparative Example 2

In this example, an acidic aqueous silica sol containing Na ion is subjected to the replacement of the aqueous medium with isopropyl alcohol.

An acidic aqueous silica sol having a pH of 4.2, an $SiO_2$ concentration of 31.1% by weight, an $Al_2O_3/SiO_2$ molar ratio of 0.0014, a viscosity of 3.0 mPa•s at 25° C., in which the colloidal silica has a calculated particle size of 12 nm from a measured specific surface area of 227 $m^2/g$, is prepared by adding 1.6 g of 5 weight % aqueous solution of NaOH to the acidic aqueous silica sol having a pH of 2.9 and an $SiO_2$ concentration of 31.2% by weight which is obtained in Example 1.

1000 g of the aqueous silica sol having a pH of 4.2 is charged into a glass reactor having an inner volume of 2 liters equipped with a stirrer, a condenser, a thermometer and an inlet for charging materials.

In the same manner as in the step (a) in Example 2, the aqueous medium in the sol is first replaced with methanol to an extent that the formed sol ha s an $SiO_2$ concentration of 32% by weight and a composition of 16 parts by weight of water and 84 parts by weight of methanol in the medium.

While the replacement of the medium in the formed sol with isopropyl alcohol was carried out in the same manner as in the step (b) in Example 2, a considerable increase in viscosity of the liquid in the reactor occurs during the replacement, and subsequently depositions of silica gel are observed on the wall of the reactor. At a point when the liquid in the reactor shows a temperature of 79.4° C. as boiling point under atmospheric pressure and the condensate counted 1.3 liters as a whole, the introduction of vapor of isopropyl alcohol into the liquid in the reactor is stopped.

There is obtained 951 g of isopropyl alcohol silica sol having an $SiO_2$ concentration of 32% by weight, a water content of 6.5% by weight, a methanol content of 5.4% by weight, a viscosity of 53 mPa·s at 20° C. and a pH of 4.5 when diluted with the same weight of water as that of the sol.

What is claimed is:

1. A method of preparing a stable propanol sol of silica having a specific surface area of 25 to 550 m²/g, said sol having an SiO₂ concentration of 10 to 50% by weight of SiO₂ and a residual content of a medium containing 7.5% by weight or less of water based on the SiO₂ and 90% by weight or more of propanol, said method comprising replacing an aqueous medium of an acidic aqueous sol of silica having a specific surface area of 25 to 550 m²/g and an Al₂O₃/SiO₂ molar ratio of 0.0004 to 0.003, said sol having an SiO₂ concentration of 5 to 50% by weight of SiO₂ and a medium having a water content of 15% by weight or more with propanol by adding propanol to said acidic aqueous sol and distilling said acidic aqueous sol under atmospheric pressure, wherein said method further comprises adding methanol to said acidic aqueous sol prior to or during said replacing of the aqueous medium in order to maintain a concentration of 5 to 50% by weight of SiO₂ in the sol and 1% by weight or more of methanol in the medium on distillation in the sol during a time of said replacing by the distillation of the aqueous medium and propanol when the medium in the sol contains 15 to 0.5% by weight of water, and said replacing continuing until said stable propanol sol is obtained.

2. A method of preparing a stable propanol sol of silica as claimed in claim 1, wherein said adding of propanol comprises adding propanol to said acidic aqueous sol of silica having a specific surface area of 25 to 550 m²/g, and said acidic aqueous sol containing substantially no cation of base in free form, thereby forming a sol having a lowered concentration of water, said distilling comprises distilling the water together with a part of the propanol out of the formed sol until a propanol silica sol having an SiO₂ concentration of 10 to 50% by weight and a residual content of a medium containing 7.5% by weight or less of water based on the SiO₂ content and 90% by weight or more of propanol is obtained, and said methanol is added to the formed sol when the medium in the formed sol contains 15 to 0.5% by weight of water, said methanol being added in an amount sufficient to maintain the SiO₂ concentration of 5 to 50% by weight in the formed sol and the concentration of 1% by weight or more of methanol in the medium in the formed sol during said distilling.

3. A method of preparing a stable propanol sol of silica as claimed in claim 2, wherein the acidic aqueous sol of silica has been deionized by a cation exchange resin, an anion exchange resin, or both.

4. A method of preparing a stable propanol sol of silica as claimed in claim 2, wherein the acidic aqueous sol of silica has a pH of 2 to 4 and contains 50 weight ppm or less of chloride ions, nitrate ions or a mixture thereof.

5. A method of preparing a stable propanol sol of silica as claimed in claim 2, wherein a polybasic acid in an amount of 0.002 to 0.7% by weight based on SiO₂ in the sol is added to the sol after completion of said replacing.

6. A method of preparing a stable propanol sol of silica as claimed in claim 2, wherein a polybasic acid in an amount of 0.002 to 0.7% by weight based on SiO₂ in the sol is added to the sol at a stage when the medium in the sol has a water content less than 5% by weight, and distillation is continued after the addition of the polybasic acid.

7. A method of preparing a stable propanol sol of silica as claimed in claim 2, wherein the propanol and the methanol to be added into the medium are in vapor form.

8. A method of preparing a stable propanol sol of silica as claimed in claim 1, wherein said adding of methanol to said acidic aqueous sol of silica occurs prior to said replacing of the aqueous medium with propanol, wherein the acidic aqueous sol of silica contains substantially no cations of base in free form and has an SiO₂ concentration of 5 to 50% by weight and residual content of water, and wherein the methanol is added by replacing water in said acidic aqueous sol of silica with methanol by a method of distillation or ultrafiltration to form an acidic sol of silica having a specific surface area of 25 to 550 m²/g, said formed acidic sol having an SiO₂ concentration of 5 to 50% by weight and containing a medium composed of 1 to 30% by weight of water and residual amount of methanol, wherein said adding of propanol comprises adding propanol to the formed acidic sol to form a ternary sol containing water, methanol and propanol, said adding of propanol occurring while distilling the water together with a part of the methanol and a part of the propanol out of the ternary sol, and wherein said method maintains an SiO₂ concentration of 5 to 50% by weight and 1% by weight or more of the remaining methanol in the ternary sol during a time when the medium in the ternary sol contains 15 to 0.5% by weight of water.

9. A method of preparing a stable propanol sol of silica as claimed in claim 8, wherein the acidic aqueous sol of silica has been deionized by a cation exchange resin, an anion exchange resin, or both.

10. A method of preparing a stable propanol sol of silica as claimed in claim 8, wherein the acidic aqueous sol of silica has a pH of 2 to 4 and contains 50 weight ppm or less of chloride ion, nitrate ion or a mixture thereof.

11. A method of preparing a stable propanol sol of silica as claimed in claim 8, wherein a polybasic acid in an amount of 0.002 to 0.7% by weight based an SiO₂ in the sol is added to the sol after completion of said replacing.

12. A method of preparing a stable propanol sol of silica as claimed in claim 8, wherein a polybasic acid in an amount of 0.002 to 0.7% by weight based on SiO₂ in the sol is added to the sol at a stage when the medium in the sol has a water content less than 5% by weight, and distillation is continues after the addition of the polybasic acid.

13. A method of preparing a stable propanol sol of silica as claimed in claim 8, wherein the propanol and the methanol to be added into the medium are in vapor form.

* * * * *